S. LUNEY.
Cultivators.
No. 149,938.  Patented April 21, 1874.
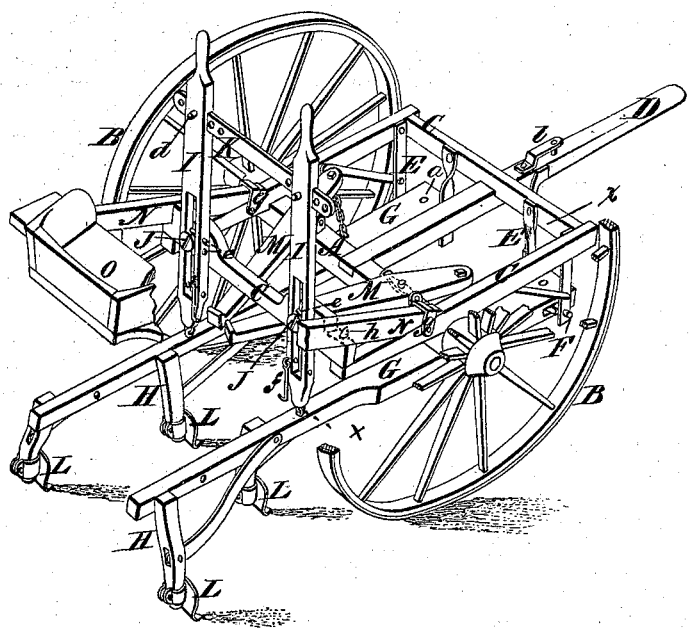
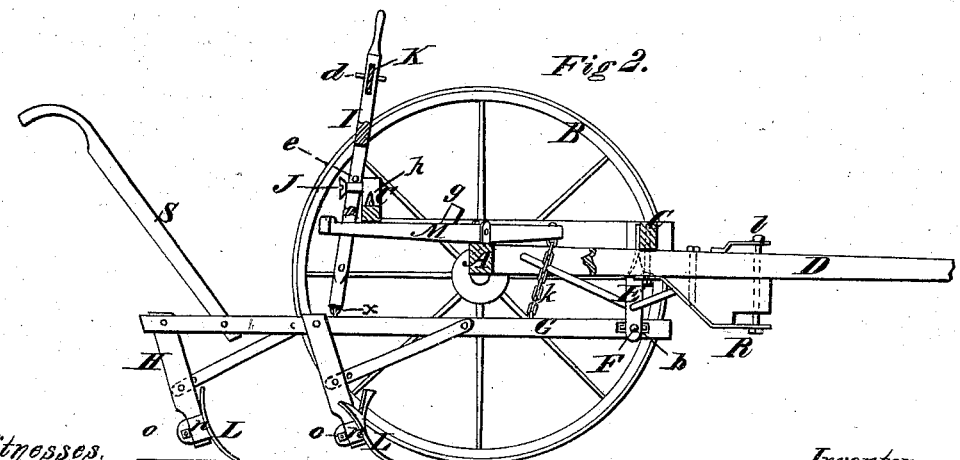
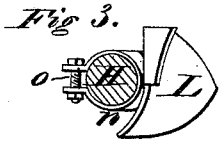

UNITED STATES PATENT OFFICE.

SAMUEL LUNEY, OF DENISON, IOWA, ASSIGNOR OF TWO-THIRDS HIS RIGHT TO WILLIAM LUNEY AND JAMES LUNEY, OF SAME PLACE.

IMPROVEMENT IN CULTIVATORS.

Specification forming part of Letters Patent No. 149,938, dated April 21, 1874; application filed March 26, 1873.

*To all whom it may concern:*

Be it known that I, SAMUEL LUNEY, of Denison, in the county of Crawford and State of Iowa, have invented certain Improvements in Cultivators, of which the following is a specification:

My invention relates to a combined walking and riding straddle-row cultivator; and consists in the use of two vertical slotted hand-levers, arranged in a peculiar manner, for moving the beams laterally and limiting their descent; and in the use of two foot-levers, mounted upon the main axle, and connected to the beams by chains, for the purpose of raising the beams.

Figure 1 is a perspective view of my machine arranged for the operator to ride, a portion of one wheel and of one of the seat-supports being broken away, in order to expose other parts to view; Fig. 2, a longitudinal vertical section of the machine arranged for the operator to walk; and Fig. 3, a cross-section of one of the standards just above the shovel, showing the manner in which the latter is constructed and attached.

In constructing my machine, I provide a straight axle, A, and mount its ends in two large wheels, B, and then secure firmly upon it a rigid rectangular frame, C, and to the middle of the frame and axle secure a straight tongue or draft-pole, D, as shown. The front of the frame I provide with two pairs of depending arms or hangers, E, to hold the beams. I then provide the two beams or drag-bars G, each having two standards and shovels at the rear end, as usual in this class of machines; and in the forward end of each beam I secure, by means of a vertical pivot, a, a horizontal plate, F, having journals or trunnions b on its ends, as shown, and then mount said journals in one pair of the arms E, as in Fig. 1. The beams thus connected to the machine are allowed a free vertical and lateral play at the rear end, and are held from twisting or turning, so as to keep the standards and shovels in an upright position. To each beam I connect, by means of an eye and staple, or similar device, an upright slotted hand-lever, I, which is held by a pivot, J, passing through its slot into the rear end of the frame, as shown. The levers serve as a means by which to throw the beams to the right and left when the operator rides, while at the same time, being slotted, they are free to slide up and down, so as to permit a vertical play of the beams. The two levers are connected by a bar, K, which is passed through them, and fastened by pins d, as shown, so as to hold the two beams at a certain distance apart, and cause them to move together. In order that the beams may be fixed at different distances apart, the bar K is provided with a series of the holes to receive the pins d, as shown in Fig. 1.

The depth to which the shovels enter the ground may be limited by passing pins e through the levers I, above their pivots J, as shown, so that the pins will come in contact with the pivots, and check the downward movement of the levers.

When the machine is being carried to and from the field, the beams may be held up, so as to keep the shovels out of the ground, by inserting pins through the lower end of the levers, above the pivots. Pins for this purpose are, therefore, attached to the levers by chains, as shown in Fig. 1, so that they cannot be lost.

When the machine is to be used as a riding-cultivator, I provide it, at the rear end, with a seat, O, supported by two arms, N, which rest upon the rear cross-bar of the frame, and are held at their forward ends in stirrups or sockets g, secured to the side bars of the frame, as shown in Fig. 1. The rear cross-bar of the frame is arranged higher than the side bars, for the special purpose of forming a bearing for the seat-supports, as shown; and, in order to prevent the supports from working out of the sockets, the frame is provided with pins or studs h, which fit into the under side of the supports, as shown in Fig. 1.

When the machine is to be arranged for the operator to walk, the seat-supports are raised from the pins h, and drawn back out of the sockets g, and thus the seat is detached from the machine.

In order to enable the operator, when riding, to raise the beams, I pivot on the axle A two foot-levers, M, and connect their front ends to the beams by chains k, so that, by depressing the rear ends of the levers with his feet, the operator may raise either or both of the beams with ease.

When the operator rides upon the machine, the seat is applied, and the double-tree attached to the top of the tongue, at $l$, so that the machine presents the appearance shown in Fig. 1.

When, however, it is desired to have the operator walk, the seat is removed, handles S attached to the rear ends of the beams, and a wide block secured to the under side of the tongue, and then the double-tree removed from the top of the tongue, and attached to the under side of the block, as shown in Fig. 2. The operator then walks behind, and controls the beams by means of the handles, in the same manner as in other walking-cultivators. When the machine is thus used as a walking-cultivator, the hand-levers and their connecting-bar hold the beams at the required distance apart, and cause them to move together in the same manner as when the operator rides. The beams may also be held up, and the descent of the shovels limited, by inserting pins through the hand-levers, as before described.

The shovel-standards H are made of wood, and their lower ends of a round form; and the shovels are provided on the back with a clasp or ring, which encircles the standard, and has its two ends united by a bolt, $o$, so that by tightening up the bolt the clasp may be drawn tightly around the standard, and the shovel thereby fastened rigidly in position.

By loosening the bolt, the band or clasp is loosened, so that the shovel may be moved up or down on the standard, or turned laterally to any desired extent.

The band or clasp may be made from sheet metal, and secured to the shovel in any suitable manner; and, instead of uniting its ends by the bolt, any other suitable device may be used.

My machine, constructed as shown and described, is exceedingly cheap and simple; it answers all the purposes of a riding and a walking cultivator; its beams are operated and controlled with great ease when the operator rides; and its shovels are readily adjusted, both vertically and laterally.

In constructing the machine, the beams should be made as long as possible, in order that the shovels may run steadily; and the wheels should be arranged about three and one-half feet apart, so that they will pass between rows of corn planted at a wide or a narrow distance apart.

Having thus described my invention, what I claim is—

1. In combination with the main frame, having the beams G attached thereto, the slotted hand-levers I, mounted on the pivots J, and provided with the eyebolts $x$ and the transverse pins $e$, which limit the descent of the beams, but allow them to rise freely and to keep a horizontal position, as set forth.

2. In combination with the hinged beams G, cross-bar $h$, and elevated seat O, the treadles M, mounted upon the main axle, and connected directly to the beams by the chains $k$, as shown.

SAMUEL LUNEY.

Witnesses:
  JOHN B. POITEVIN,
  GEO. W. HESTON.